Patented Oct. 21, 1952

2,614,945

UNITED STATES PATENT OFFICE 2,614,945

METHOD OF MAKING MOBILE STARCH POWDERS

George A. Krisan, Riverside, Ill.

No Drawing. Application September 14, 1949,
Serial No. 115,765

11 Claims. (Cl. 117—100)

This invention relates to a new and improved type of dusting powder. It particularly relates to dusting powders made from various starches and to methods of preparation thereof.

A satisfactory dusting powder should be a highly mobile free flowing powder. Furthermore, the individual particles of the powder should not stick or clump together, as this will prevent proper dispersion of the powder into its individual particles when it is dusted. This latter property is a necessary requirement if a fine uniform coating is to be obtained on the material being dusted.

Powdered starches have been used for many years as dusting powders because they are non-harmful in such applications where they may come in contact with food products and because they do not present an industrial hazard to workmen who may inhale the dust. Starches, however, have certain drawbacks which make their use for dusting purposes not entirely satisfactory. The primary shortcoming of starch powders as used for this purpose is the fact that they are somewhat hygroscopic and will pick up moisture from the air. Under average humidity conditions starches will thus reach an equilibrium moisture content which may vary from 12% to 18% depending on the variety of starch and humidity conditions encountered. At these moisture contents starch powders are not free flowing or mobile. The starch granules tend to clump together and do not readily disperse into the individual granules when dusted. For this reason it has been the usual practice to use for dusting purposes redried starches wherein the moisture content has been reduced to about 5%. With such reduced moisture content starch powders have better mobility and dispersing properties, and can be used with a better degree of satisfaction. The use of such redried starch powders, however, involves storage of the starch under conditions where it cannot come in contact with air of normal humidity content and, furthermore it may be exposed to air for only a short period of time as it is used. If exposed for longer than a short period the moisture pickup from the air soon causes it to lose the necessary free flowing and dispersing properties. Attempts have been made to overcome these disadvantages of starch dusting powders by blending small amounts of finely powdered materials, such as talc, mica, di-calcium phopshate, magnesium carbonate and various other material. Although such additions slightly improve the mobility and dispersing properties of the starch the results in this respect still leave much to be desired.

It is an object of this invention to overcome the difficulties encountered with the previous starch powders as used for dusting purposes, by providing a new and improved starch base dusting powder which has superior free flowing and mobility properties which are not adversely affected by the highest humidity conditions likely to be encountered. The product of this invention is unique in that although like previously used dusting powders it will pick up moisture from the air, such moisture will not cause it to lose its free flowing and dispersing properties. The need for special storage and handling conditions is therefore eliminated.

A further object of this invention is to provide a starch base dusting powder with a greater mobility and superior dispersing properties as compared to the redried starches previously used for this purpose.

Another object of this invention is to provide a starch base dusting powder which may be readily manufactured with available materials and which is relatively low in cost.

Another object of this invention is to provide a starch base dusting powder which is not only superior for general dusting purposes but which is particularly suitable for the prevention of offsetting in the printing trade. The improved mobility and free flowing properties of the product of this invention and its superior dispersing quality make it very valuable for this purpose.

The improved dusting product of this invention consists primarily of starch so treated as to uniformly envelop the individual starch granules with a thin layer of non-hygroscopic material. To accomplish this result it is necessary for the enveloping material to consist of particles considerably smaller in size than the granules of starch. The means utilized in this invention for obtaining enveloping materials in sufficiently small particle form is the use of freshly prepared precipitates as formed by the reaction of two or more chemicals which in aqueous solution react to form an insoluble compound.

To produce the product of the invention the aqueous suspension of precipitated material is thoroughly mixed with the starch and the resultant mixture then dried and ground to a fine powder. A preferred alternate method of preparing the product of this invention is to precipitate the enveloping material in the presence of the starch rather than in a separate operation.

Although the exact mechanism of this action is not understood, it seems probable that the small particles of freshly precipitated material surrounding the starch granules are deposited on and adhere to the surfaces of the starch granules as a result of the drying operation. The same results are not obtained merely by dry blending, possibly because the particle size of the added material is not small enough to coat the starch granule. In any case, however, the results of this treatment of the starch insofar as its effect in improving the mobility and dispersing properties of the starch is very striking.

The invention is further illustrated but is not limited by the following examples which illustrate its practice and the limiting factors involved. In these specific examples the quantities stated are parts by weight unless otherwise stated.

Example I

To 450 parts of potato starch dispersed in 1000 parts water was added 9 parts of aluminum sulfate dissolved in 40 parts of water. The mixture was agitated for about 10 minutes, then 10 parts tri-sodium phosphate dissolved in 40 parts of water was added. The agitation was continued for about 10 minutes after which the bulk of the water was separated from the starch by filtration. The resultant damp starch product was then dried to about 15% moisture content and ground to a fine powder.

This powder is the product of the invention and differs from the original untreated starch material very markedly in its highly mobile character and its ready dispersability.

The proportions of chemicals used in this example are approximate and are based on the following equation:

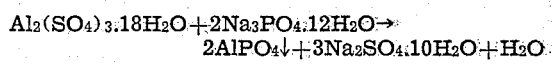

$Al_2(SO_4)_3 \cdot 18H_2O + 2Na_3PO_4 \cdot 12H_2O \rightarrow 2AlPO_4 \downarrow + 3Na_2SO_4 \cdot 10H_2O + H_2O$ This example illustrates good practice in the application of the invention in making a highly satisfactory dusting product. Although a larger proportion of the chemicals to starch may be used than the proportions specified in the example (about 4.2% by weight of the starch) without detriment to the mobility and dispersing properties of the final product, the use of such larger proportions does not improve the mobility or dispersing properties of the final product.

The order in which the chemicals are added to aqueous starch suspension is not critical and they do not necessarily have to be in the form of solutions at the time of addition. When the chemicals are added to the aqueous starch suspension in dry form it is difficult to determine when complete solution and reaction with each other have taken place. For this reason it is usually desirable to add the chemicals in the form of solutions.

Example II

The procedure followed in this example was the same as that followed in Example I except that the proportions of chemicals to starch were reduced. In this example only 0.9 part of aluminum sulfate and 1.0 part of tri-sodium phosphate were used to 450 parts of potato starch. The final product obtained in this example was equivalent to that of Example I and represents good practice in the application of the invention.

Example III

The procedure in this example was the same as that followed in Example I, except that a still further reduction in the proportion of chemicals to starch was made. In this example only 0.18 part of aluminum sulfate and 0.20 part of trisodium phosphate were used to 450 parts of potato starch. The final product of this example was inferior both in mobility and dispersing properties to the product of Examples I and II.

Although the product of this example is definitely superior in these properties to ordinary redried potato starch it may be considered as indicating the lower limit in the proportion of chemicals to starch which will give effective results.

Example IV

This example illustrates a method of preparing the product of the invention wherein a lesser amount of water is used than in the previous examples:

450 parts of potato starch was placed in a mixing device, of the type suitable for mixing dry, or semi-dry, materials, and agitated. The starch used in this instance contained about 16% moisture. As the starch was agitated 4.5 parts of aluminum sulfate dissolved in 100 parts of water was slowly added to the starch. After the aluminum sulfate solution was thoroughly mixed with the starch, 5 parts of tri-sodium phosphate dissolved in 100 parts of water was added and agitation continued until it also was uniformly dispersed throughout the starch mixture. The resultant damp starch mixture was then dried to about 15% moisture content and ground to a fine powder. The mobility and the dispersing properties of the powdered product were equivalent to those produced in Examples I and II.

Example V

This example illustrates the use of a smaller proportion of water in preparing the product of this invention and indicates the minimum limit of water necessary to obtain thorough distribution of the chemicals and proper reaction between them:

450 parts of potato starch was placed in a mixing device suitable for mixing substantially dry materials and agitated. The starch used in this instance contained 13% moisture. As the starch was agitated 4.5 parts of aluminum sulfate dissolved in 20 parts of water was sprayed into the starch. After the aluminum sulfate solution was thoroughly dispersed throughout the starch, 5 parts of tri-sodium phosphate dissolved in 20 parts of water was sprayed into the mixture and agitation continued until it also was uniformly dispersed throughout the starch mixture. The resultant mixture of starch and chemicals was then dried to about 12% moisture and ground to a fine powder. The mobility and the dispersing properties of the powdered product were superior to powdered redried starch but was inferior in these qualities to the products in Examples I, II and IV. The results in this example indicate that a minimum of about 25% moisture content is required in the starch and chemical mixture to obtain satisfactory results.

Example VI

This example illustrates the effective use of other chemical combinations than those demonstrated in the previous examples:

To 450 parts of potato starch dispersed in 1000 parts of water was added 10 parts of aluminum sulfate dissolved in 40 parts of water. The mixture was agitated ten minutes and then 5 parts of soda ash dissolved in 40 parts of water was added. The agitation was continued for about ten minutes after which the bulk of the water was separated from the starch by filtration. The resultant damp starch product was then dried to about 15% moisture content and ground to a fine powder. The powdered product obtained in this example was equivalent to those of Examples I, II and IV in mobility and dispersing quality. The proportions of chemicals used in this example are approximate and are based on an assumed reaction formula as follows:

$$Al_2(SO_4)_3 \cdot 18H_2O + 3Na_2CO_3 \rightarrow 2Al(OH)_3\downarrow + 3H_2CO_3 + 3Na_2SO_4 + 12H_2O$$

Example VII

This example is another illustration of the effective use of chemical combinations other than those previously demonstrated.

To 450 parts of potato starch dispersed in 1000 parts of water was added 6 parts of Epsom salts dissolved in 50 parts of water. The mixture was agitated for about 10 minutes then 6 grams of tri-sodium phosphate dissolved in 50 parts of water was added. The agitation was continued for about 10 minutes after which the bulk of water was separated from the starch by filtration. The resultant damp starch product was then dried to about 15% moisture content and ground to a fine powder. The powdered product obtained in this example was equivalent to those of Examples I, II, IV and VI in mobility and dispersing quality. The proportions of chemicals used in this example are approximate and are based on the following chemical equation:

$$3MgSO_4 \cdot 7H_2O + 2Na_3PO_4 \cdot 12H_2O \rightarrow Mg_3(PO_4)_2 \cdot 8H_2O\downarrow + 3Na_2SO_4 + 11H_2O$$

Example VIII

This example also illustrates the effective use of chemical combinations other than those previously demonstrated.

To 450 parts of potato starch dispersed in 1000 parts of water was added 5 parts of cupric sulfate (anhydrous) dissolved in 100 parts water. The mixture was agitated for about 10 minutes then a 1% solution of sodium hydroxide was slowly added to bring the pH of the mixture to 7.0. Agitation was continued for another 10 minutes after which the bulk of the water was separated from the starch by filtration. The damp starch product was then dried to about 15% moisture content and ground to a fine powder. The powdered product of this example was a light blue in color but was equivalent to the products of Examples I, II, IV, VI and VII in mobility and dispersing quality. The proportions of chemicals used in this example are approximate and are based on the following chemical equation:

$$CuSO_4 + 2NaOH \rightarrow Cu(OH)_2\downarrow + Na_2SO_4$$

Because of the cupric hydroxide content the dusting product of this experiment is effective as a fungicide. Greater or lesser proportions of chemicals can be used to give a greater or lesser degree of strength in this respect, while other ingredients can be added to cause it to also function as an insecticide.

Example IX

This example also illustrates the effective use of other chemical combinations than those previously demonstrated:

To 450 parts potato starch dispersed in 1000 parts water was added 12 parts of calcium chloride dissolved in 50 parts of water. The mixture was agitated ten minutes, then 10 parts of soda ash dissolved in 50 parts of water was added. The agitation was continued for about 10 minutes after which the bulk of the water was separated by filtration. The resultant damp starch product was then redried to about 15% moisture content and ground to a fine powder. The product obtained in this example had good mobility and dispersing properties but was not quite as good in these qualities as Examples I, II, IV, VI, VII and VIII. The proportions of chemicals used in the example are approximate and are based on the chemical equation:

$$CaCl_2 + Na_2CO_3 \rightarrow CaCO_3\downarrow + NaCl$$

Example X

This example illustrates the use of another chemical combination which is quite effective:

To 450 parts of potato starch dispersed in 1000 parts of water was added 14 parts zinc sulfate dissolved in 100 parts water. The mixture was agitated for about 10 minutes then 4 parts of sodium hydroxide dissolved in 200 cc. of water was slowly added to the mixture. Agitation was continued about 10 minutes after which the bulk of the water was separated from the starch by filtration. The resultant damp starch product was then dried to about 15% moisture content and ground to a fine powder. The product of this example had good mobility and dispersing quality but was not as good in this respect as Examples I, II, IV, VI, VII and VIII. The proportions of chemicals used in this example are approximate and are based on the chemical equation:

$$ZnSO_4 \cdot 7H_2O + 2NaOH + 3H_2O \rightarrow Zn(OH)_2\downarrow + Na_2SO_4 \cdot 10H_2O$$

Example XI

This example also illustrates another chemical combination suitable for the practice of the invention:

To 450 parts of potato starch dispersed in 1000 parts of water was added 6.5 parts of calcium chloride dissolved in 50 parts water. The mixture was agitated for about 10 minutes, then 14 parts of magnesium sulfate dissolved in 50 parts water was added. The agitation was continued for about 10 minutes after which the bulk of the water was removed by filtration. The resultant damp starch product was then dried to about 15% moisture content and ground to a fine powder. The product of this example had good mobility and dispersing quality, although it was not as good in this respect as Examples I, II, IV, VI, VII and VIII. The proportions of chemicals used in this example are approximate and are based on an assumed reaction formula as follows:

$$CaCl_2 + MgSO_4 \cdot 7H_2O + H_2O \rightarrow CaSO_4 \cdot 2H_2O\downarrow + MgCl_2 \cdot 6H_2O$$

Example XII

This example again demonstrates another satisfactory combination of chemicals:

To 450 parts of potato starch dispersed in 1000 parts of water was added 8 parts of sodium silicate dissolved in 50 pts. water. The mixture was agitated for about 10 minutes, then 4° Bé. hydrochloric acid solution was slowly added to the mixture to bring the pH to 6.0. The agitation was continued for about 10 minutes after which the bulk of the water was removed by filtration. The resultant damp product was then dried to about 15% moisture content and ground to a fine powder. The product of the example had good mobility and dispersing properties. The proportions of chemicals used in this example are approximate and are based on the following chemical equation:

$$Na_2SiO_3 \cdot 9H_2O + 2HCl \rightarrow H_4SiO_4\downarrow + 2NaCl + 8H_2O$$

Example XIII

This example illustrates another suitable combination of chemicals:

To 450 parts of potato starch dispersed in 1000 parts water was added 10 parts of barium chloride dissolved in 60 parts of water. The mixture was agitated for 10 minutes, then 7 parts of sodium sulfate dissolved in 60 parts of water was added. The agitation was continued for 10 minutes after which the bulk of the water was removed by filtration. The resultant damp product was then dried to about 15% moisture content and ground to a fine powder. The product of this example was likewise satisfactory from the standpoint of mobility and dispersability. The proportions of chemicals used in the example are approximate and are based on the following chemical equation:

$$BaCl_2 + Na_2SO_4 \rightarrow BaSO_4\downarrow + 2NaCl$$

Example XIV

This example again demonstrates another suitable combination of chemicals:

To 450 parts of potato starch dispersed in 1000 parts of water was added 12 parts of tri-sodium phosphate dissolved in 60 parts of water. The mixture was agitated for 10 minutes then 5 parts calcium chloride dissolved in 40 parts water was added. The agitation was continued for 10 minutes after which the bulk of the water was removed by filtration. The resultant damp product was then dried to 15% moisture content and ground to a fine powder. The product of this example was also satisfactory from the standpoint of mobility and dispersability. The proportions of chemicals used in this example are approximate and are based on the following chemical equation:

$$2Na_3PO_4 \cdot 12H_2O + 3CaCl_2 \rightarrow Ca_3(PO_4)_2\downarrow + 6NaCl + 12H_2O$$

Example XV

This example illustrates the use of wheat starch in making the product of the invention:

To 450 parts of wheat starch dispersed in 1000 parts of water was added 9 parts of aluminum sulfate dissolved in 40 parts of water. The mixture was agitated for 10 minutes, then 10 parts of tri-sodium phosphate dissolved in 40 parts water was added. The agitation was continued for about 10 minutes after which the bulk of the water was removed from the starch by filtration. The resultant damp product was then dried to about 15% moisture content and ground to a fine powder. The product of this experiment compared favorably to those of the previous examples both in mobility and dispersing quality. The chemicals used in this example are the same as used in Example I.

Example XVI

The procedure followed in this example was the same as that followed in Example XV, except that corn starch was used instead of wheat starch. The resultant product had good mobility and dispersion properties.

Example XVII

The procedure followed in this example was the same as that followed in Example XV, except that tapioca starch was used instead of wheat starch. The resultant product was very satisfactory in regard to mobility and dispersing quality.

Example XVIII

The procedure followed in this example was the same as that followed in Example XV, except that arrow root starch was used instead of wheat starch. The resultant dusting product was very satisfactory in mobility and dispersing properties.

The above examples illustrate only a few of the many different combinations of chemicals that may be used in the practice of this invention. This will be apparent to those who are familiar with the chemical art. It is intended that these examples demonstrate the fact that any two or more chemicals which in solution react to form an insoluble precipitate are effective in accomplishing the purposes of the invention.

*Example XIX*

This example demonstrates a different procedure than the preceding examples in that the reaction of the chemicals to form the precipitate does not take place in the presence of the starch:

To 9 parts of aluminum sulfate dissolved in 100 parts of water was added 10 parts of tri-sodium phosphate dissolved in 100 parts of water. The resultant aqueous suspension of the precipitated reaction product was then added to 450 parts of potato starch dispersed in 1000 parts of water. The mixture was then agitated thoroughly for about 10 minutes after which the bulk of the water was removed by filtration. The resultant damp starch product was then dried to about 15% moisture content and ground to a fine powder. The powdered product of this example had very good mobility and dispersing properties.

In treating a starch with this method of procedure it is desirable that the precipitated material be freshly precipitated. In other words, it should not be allowed to age too long before adding it to the starch. If the precipitated material is allowed to age for too long a period, it tends to agglomerate and cannot be readily dispersed to its original small particle form when mixed with the starch.

Although in the examples given the proportions of chemicals used were based on the combining chemically equivalent proportions, an excess of either of the chemicals may generally be used without a detrimental effect on the final product. The exceptions to this statement, however, would be such instances of unbalance that would prevent the formation of an insoluble precipitate and where excessive amounts of chemicals, such as sodium hydroxide, would cause gelatinization of the starch.

The limiting factors of the invention are demonstrated by Examples III and V.

Example III shows the minimum proportions of chemicals required to obtain a reasonable degree of mobility and dispersing quality. Although the minimum required amount of chemicals will vary somewhat with different chemical combinations, it may be stated generally that at least 1 part of the precipitated reaction product is required for 6800 parts of starch. These proportions are based on dry weights estimated from proportions of chemicals used in Example III.

Example V shows the minimum of water that may be used in the starch and chemical combination in order to obtain satisfactory reaction between the chemicals. This also will vary somewhat with different combinations, but in general it may be stated that at least 25% moisture content is required in the starch and chemical combination.

There is no definite upper limit on the proportions of chemicals or water except practical considerations. The examples demonstrate good practice in pursuing the teachings of the invention. As a practical matter, there is no point in employing an excess of the precipitate forming reagents where a smaller quantity will produce the optimum effect, unless the precipitate also has functions apart from its function in increasing the mobility and dispersability of the starch. Thus, in Example VIII, the precipitated material, being a copper salt, functions as a fungicide. In some cases, the physical nature of the precipitate will limit the quantity used to a maximum around 10% by weight of the starch.

The products of the present invention, although containing in many instances more moisture than the original starches, retain their mobility and free flowing properties under ordinary atmospheric conditions, even at relatively high humidities. The preferred products contain from 10% to 30% by weight of moisture in the final product. The amount of moisture therein may be varied depending upon the use of the product. Where the product is employed in printing or in the graphic arts field, the optimum moisture content is 15–20% by weight. The products containing relatively large amounts of moisture have the advantage of more rapid settling in the atmosphere.

The temperature at which the precipitation is effected may vary widely from a minimum above the freezing point of the liquid used as the reaction medium to a maximum below the gelatinization temperature of the starch. Excellent results have been obtained at temperatures of 50° to 80° F.

Examples IV and V demonstrate the practice of the invention wherein for practical reasons it is desired to use a minimum amount of water in preparing the product, such as in cases where filtration equipment is not available. The other examples, however, illustrate the preferred practice if the product is made in the starch manufacturing plant.

Examples XV, XVI, XVII and XVIII demonstrate the fact that the practice of the invention is not limited to only one variety of starch. Any variety of starch may be used in the practice of the invention, including potato, tapioca, rice, rye, corn, wheat, waxy maize, sorghum starch, sago, arrowroot, yucca, sweet potato, barley and canna. The particular starch to be used in determined by practical considerations, such as availability, cost, and the grain size desired in the dusting powder. Potato starch, for example, has larger granules than the other starches mentioned, and therefore would be used for such purposes where a larger grain size is dsirable.

The precipitation reaction product is preferably formed in situ in the presence of the starch either by adding one reagent to the starch followed by a precipitant or by adding both reagents simultaneously. It is preferred, however, to allow the starch to absorb an aqueous solution of one reagent before adding the second reagent to bring about the double decomposition which results in the formation of the precipitate. Although the invention is not limited to any theory, the results obtained may be due in part at least to the penetration of the precipitate forming chemicals into the envelope of the starch granule.

Especially good results have been obtained by coating the starch granules with freshly precipitated water insoluble salts and hydroxides of aluminum, magnesium, copper and silicon, e. g., aluminum phosphate, aluminum hydroxide, magnesium posphate, cupric hydroxide and silicic acid.

The term "mobile" is used herein to describe the free flowing characteristic of the powdered starch granules which distinguishes them from ordinary starches that tend to cake or agglomerate.

Substantial amounts of other powdered material may be blended with the dusting product of this invention without serious detriment to its mobility and dispersing quality. It is useful as a base material to carry fungicides, insecticides, and medicaments.

It has been found that the products of the invention (e. g., the product of Example I are especially suitable for preventing off-set in printing processes. In one such process where a powdered material is fed from a hopper by means of a roll and discharges adjacent an electronic tube, the products of the present invention discharge more readily and in a more highly dispersed form than ordinary starches. Other mechanical devices in which the dusting powder is discharged by other means, such as air blast spraying or sifting methods, likewise give good results with the products of the invention.

The invention is hereby claimed as follows:

1. The method of forming a mobile powdered composition which comprises essentially intimately mixing and coating starch granules in the presence of moisture with a finely divided freshly precipitated water insoluble solid of smaller particle size than the starch granules and drying the resultant coated granles, said finely divided water insoluble solid being from the group consisting of freshly precipitated water insoluble inorganic salts and hydroxides.

2. The method of forming a mobile powdered composition which comprises essentially intimately mixing and coating starch granules in the presence of at least 25% by weight of moisture, calculated on the weight of the starch, with a finely divided freshly precipitated water insoluble solid of smaller particle size than the starch granules and drying the resultant coated granules, said finely divided water insoluble solid being from the group consisting of freshly precipitated water insoluble inorganic salts and hydroxides.

3. The method of forming a mobile powdered composition which comprises essentially intimately dispersing a starch in water with a plurality of water soluble compounds which react in situ by double decomposition to form a finely divided water insoluble solid precipitate of smaller particle size than the starch granules and drying the resultant product, said finely divided water insoluble solid being from the group consisting of freshly precipitated water insoluble inorganic salts and hydroxides.

4. The method of forming a mobile powdered composition comprising intimately dispersing a starch in water with a plurality of water soluble inorganic compounds which react in situ by double decomposition to form a finely divided water insoluble solid precipitate of smaller particle size than the starch granules and drying the resultant product, said finely divided water insoluble solid being from the group consisting of freshly precipitated water insoluble inorganic salts and hydroxides.

5. The method of forming a mobile powdered composition comprising intimately dispersing a starch in water with a plurality of water soluble compounds which react in situ by double decomposition to form a finely divided water insoluble solid precipitate of smaller particle size than the starch granules and drying the resultant product, the quantity of said precipitate corresponding to at least one part per 6800 parts by weight of starch, said finely divided water insoluble solid being from the group consisting of freshly precipitated water insoluble inorganic salts and hydroxides.

6. The method of forming a mobile powdered composition comprising intimately dispersing a potato starch in water with a plurality of water soluble compounds which react in situ by double decomposition to form a finely divided water insoluble solid precipitate of smaller particle size than the starch granules and drying the resultant product, said finely divided water insoluble solid being from the group consisting of freshly precipitated water insoluble inorganic salts and hydroxides.

7. A method of forming a mobile powdered composition which comprises essentially intimately dispersing a starch in water, adding aluminum sulfate and trisodiumphosphate in an amount sufficient to form a finely divided precipitate which coats the starch granules, and removing moisture from the resultant product until a mobile product is obtained.

8. A method of forming a mobile powdered composition which comprises essentially intimately dispersing a starch in water, adding magnesium sulfate and trisodiumphosphate in an amount sufficient to form a finely divided precipitate which coats the starch granules, and removing moisture from the resultant product until a mobile product is obtained.

9. A method of forming a mobile powdered composition which comprises essentially intimately dispersing a starch in water, adding cupric sulfate and sodium hydroxide in an amount sufficient to form a finely divided precipitate which coats the starch granules, and removing moisture from the resultant product until a mobile product is obtained.

10. A method of forming a mobile powdered composition which comprises essentially intimately dispersing a starch in water, adding aluminum sulfate and sodium carbonate in an amount sufficient to form a finely divided precipitate which coats the starch granules, and removing moisture from the resultant product until a mobile product is obtained.

11. A method of forming a mobile powdered composition which comprises essentially intimately dispersing a starch in water, adding sodium silicate and hydrochloric acid in an amount sufficient to form a finely divided precipitate which coats the starch granules, and removing moisture from the resultant product until a mobile product is obtained.

GEORGE A. KRISAN.

REFERENCES CITED

The following references are of record in the file of this patent:

UNITED STATES PATENTS

| Number | Name | Date |
|---|---|---|
| 1,432,440 | Burmeister | Oct. 17, 1922 |

FOREIGN PATENTS

| Number | Country | Date |
|---|---|---|
| 62,755 | Switzerland | 1912 |
| 91,411 | Austria | Feb. 26, 1923 |
| 505,502 | Great Britain | 1939 |

OTHER REFERENCES

Poucher: "Perfumes & Soaps" (1929), vol. 11, pgs. 482-483).

"Chemical Engineering Hand Book" by Perry, 3d, ed., page 1071.